United States Patent
Kleinhenz (10) Patent No.: US 6,568,125 B2
(45) Date of Patent: May 27, 2003

(54) PEST CONTROL DEVICE

(76) Inventor: Charles Kleinhenz, P.O. Box 485, Taylorsville, IN (US) 47280

(*) Notice: Subject to any disclaimer, the term of this patent is extended or adjusted under 35 U.S.C. 154(b) by 0 days.

(21) Appl. No.: 10/117,149

(22) Filed: Apr. 5, 2002

(65) Prior Publication Data

US 2002/0108296 A1 Aug. 15, 2002

Related U.S. Application Data (63) Continuation of application No. 09/448,206, filed on Nov. 23, 1999, which is a continuation-in-part of application No. 09/294,990, filed on Apr. 19, 1999, now abandoned, which is a continuation of application No. 09/044,322, filed on Mar. 19, 1998, now Pat. No. 5,915,950.

(51) Int. Cl.[7] .............................................. A01M 1/08
(52) U.S. Cl. ........................ 43/139; 43/113; 43/107
(58) Field of Search .......................... 43/139, 113, 107, 43/132.1

(56) References Cited

U.S. PATENT DOCUMENTS

| | | | | |
|---|---|---|---|---|
| 738,184 A | * | 9/1903 | Goodwin | 43/139 |
| 919,907 A | * | 4/1909 | Martin et al. | 43/139 |
| 959,155 A | * | 5/1910 | Nault | 43/139 |
| 993,644 A | * | 5/1911 | Brisbane | 43/139 |
| 995,911 A | * | 6/1911 | Russel | 43/139 |
| 1,006,271 A | * | 10/1911 | Powers | 43/139 |
| 1,071,620 A | * | 8/1913 | Kingsland | 43/139 |
| 1,807,550 A | * | 5/1931 | Rector | 43/139 |
| 2,236,698 A | * | 4/1941 | Rector | 43/139 |
| 2,694,879 A | * | 11/1954 | Stoll | 43/139 |
| 2,778,150 A | * | 1/1957 | Pohlman | 43/139 |
| 2,879,620 A | * | 3/1959 | McGinnis | 43/139 |
| 3,238,557 A | | 3/1966 | Foster | |
| 3,336,694 A | | 8/1967 | O'Connell | |
| 3,750,327 A | * | 8/1973 | Thybault | 43/139 |
| 4,127,961 A | | 12/1978 | Phillips | |
| 4,141,174 A | * | 2/1979 | Smith | 43/139 |
| 4,175,352 A | | 11/1979 | Catlett | |
| D263,068 S | | 2/1982 | Knebel | |
| 4,391,017 A | | 7/1983 | Bruensicke | |
| 4,519,160 A | | 5/1985 | McBrayer | |
| 4,566,218 A | * | 1/1986 | Kurosawa et al. | 43/58 |
| 4,625,453 A | * | 12/1986 | Smith | 43/139 |
| 4,776,060 A | | 10/1988 | Chang | |
| 4,825,582 A | | 5/1989 | Szynal | |
| 4,965,959 A | * | 10/1990 | Gagne | 43/58 |
| 4,979,330 A | | 12/1990 | Rorant | |
| 5,023,973 A | | 6/1991 | Tsuchida et al. | |
| 5,040,326 A | * | 8/1991 | Van Dijnsen et al. | 43/139 |
| 5,052,147 A | | 10/1991 | Broomfield et al. | |

(List continued on next page.)

FOREIGN PATENT DOCUMENTS

| | | | | |
|---|---|---|---|---|
| EP | 129504 B1 | * | 12/1984 | |
| EP | 941660 B1 | * | 9/1999 | |
| EP | 1040756 B1 | * | 10/2000 | |
| JP | 5-161443 B1 | * | 6/1993 | |
| JP | 11-103747 B1 | * | 4/1999 | |
| SU | 704573 B1 | * | 12/1979 | 43/113 |
| WO | WO 87/00727 | | 2/1987 | |
| WO | WO-97/10709 B1 | * | 3/1997 | |
| WO | WO-01/97609 B1 | * | 12/2001 | |

*Primary Examiner*—Darren W. Ark
(74) *Attorney, Agent, or Firm*—Woodard, Emhardt, Naughton Moriarty & McNett (57) ABSTRACT

A pest control apparatus is provided including a vacuum adapted to suction air from an inlet upon the actuation thereof. Also included is a mechanical housing with attractor means for luring pests to a position where the pests may be suctioned. A trigger means is provided for actuating the vacuum either based on a sensor detecting a pest or intermittently based on expiration of a timer. A one way valve prevents the pests from escaping.

16 Claims, 7 Drawing Sheets

U.S. PATENT DOCUMENTS

| | | | |
|---|---|---|---|
| 5,116,219 A | * 5/1992 | Zimmerman | 43/139 |
| 5,123,142 A | 6/1992 | Miller | |
| 5,123,201 A | * 6/1992 | Reiter | 43/107 |
| 5,142,731 A | 9/1992 | Resch | |
| 5,157,865 A | * 10/1992 | Chang | 43/113 |
| 5,305,495 A | 4/1994 | Nelsen et al. | |
| 5,311,697 A | 5/1994 | Cavanaugh et al. | |
| 5,323,556 A | 6/1994 | Carle | |
| 5,329,725 A | 7/1994 | Bible | |
| 5,367,821 A | 11/1994 | Ott | |
| 5,410,775 A | 5/1995 | Frazier | |
| 5,411,150 A | 5/1995 | Sigurdsson | |
| 5,417,009 A | * 5/1995 | Butler et al. | 43/113 |
| 5,647,164 A | * 7/1997 | Yates | 43/139 |
| 5,915,950 A | * 6/1999 | Kleinhenz | 43/139 |
| 5,926,997 A | * 7/1999 | Wilcox | 43/139 |
| 6,032,406 A | * 3/2000 | Howse et al. | 43/107 |
| 6,050,025 A | * 4/2000 | Wilbanks | 43/139 |
| 6,202,343 B1 | * 3/2001 | Mah | 43/139 |
| 6,467,215 B1 | * 10/2002 | Nelson et al. | 43/139 |

* cited by examiner

PEST CONTROL DEVICE

RELATED APPLICATIONS

The present application is a continuation of U.S. patent application Ser. No. 09/448,206, filed Nov. 23, 1999, which is a continuation-in-part of Ser. No. 09/294,990, filed Apr. 19, 1999 now abn.; which is a continuation of Ser. No. 09/044,322 filed Mar. 19, 1998. Ser. No. 09/044,322 is now U.S. Pat. No. 5,915,950 which is incorporated herein by reference. Ser. Nos. 09/294,990, 09/044,322 and 09/448,206 are all incorporated herein by reference.

BACKGROUND OF THE INVENTION

The present invention relates to bug vacuums and more particularly pertains to a unique eliminator for attracting and capturing various insects. Bug vacuums of many types have been developed in the past art. More specifically, bug vacuums heretofore devised and utilized are known to consist basically of familiar, expected and obvious structural configurations, notwithstanding the myriad of designs encompassed by the prior art which have been developed for the fulfillment of countless objectives and requirements. Examples of known bug vacuums are shown in: U.S. Pat. No. 4,979,330; U.S. Pat. No. 5,305,495; U.S. Pat. No. Des 263,068; U.S. Pat. No. 5,052,147; U.S. Pat. No. 4,825,582; and U.S. Pat. No. 5,367,821.

The pest control apparatus of the present invention departs from the conventional concepts and designs associated with the prior pest control apparatus, and provides a unique apparatus for attracting and capturing insects in indoor locations, as well as in outdoor locations. In view of the foregoing disadvantages inherent in the known types of bug vacuums now present in the prior art, the present invention provides a new pest control apparatus construction wherein the same can be utilized for both attracting and capturing various insects.

SUMMARY OF THE INVENTION

In one aspect of this invention the pest control apparatus comprises: a vacuum adapted to suction air from an inlet upon the actuation thereof; and attractor means for luring pests to a position where the pest may be suctioned. The pest control apparatus has trigger means for actuating the vacuum; and a one way valve in fluid communication with the inlet to prevent the pests from escaping.

In another aspect of the invention the apparatus, comprises a vacuum having an inlet and a mechanical housing in fluid communication with said inlet. The housing has an opening adapted for allowing passage of a pest into the housing. The housing has bait within in it adapted for attracting the pest. The bait includes at least one light source and at least one chemical button. The vacuum removes the pest from the mechanical housing. One object of the present invention is to provide a unique pest control device.

Related objects and advantages of the present invention will be apparent from the following.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
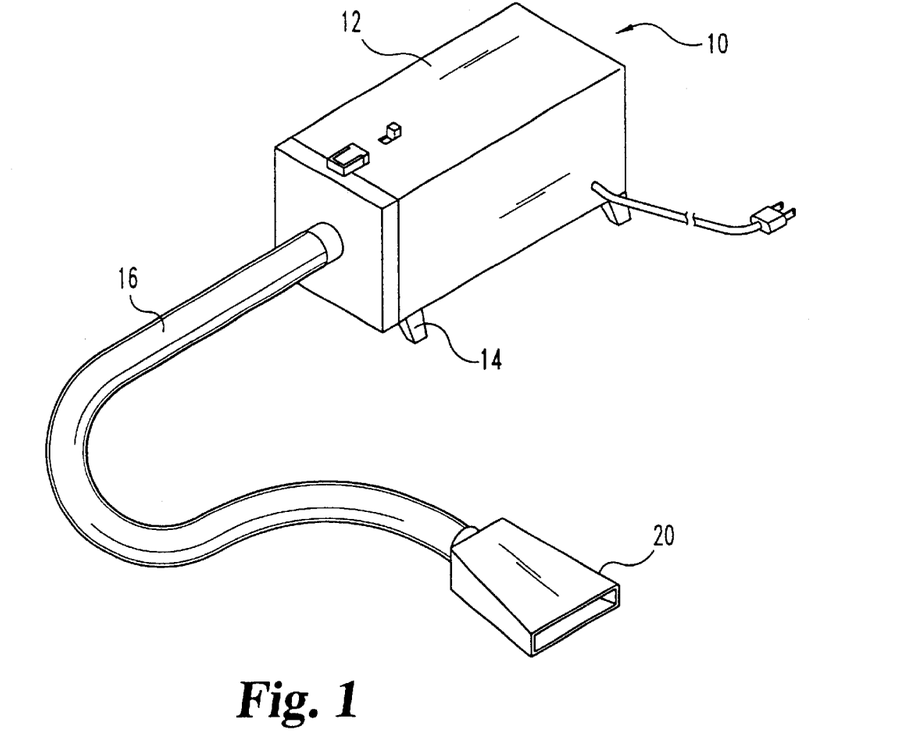
FIG. 1 is a perspective view of one embodiment of a pest control apparatus according to the present invention.

With reference to FIG. 1, in one embodiment pest control apparatus 10 includes a vacuum 12. The vacuum housing may have a rectangular, square, circular, or other geometric shape. The vacuum 12 is shown in FIG. 1 including a plurality of feet 14 for resting on a surface such that the vacuum 12 is elevated. However, in an alternate embodiment the vacuum 12 is not elevated from the surface. During use, the vacuum 12 is adapted to draw air from an inlet upon the actuation thereof. A removable bag 15 (see FIG. 5) is disposed within the vacuum 12 for containing insects. The vacuum bag 15 is preferably made of a high quality material sufficiently strong and fine enough to prevent particles or pests from escaping after being sucked in from the inlet.

Next provided is an elongated flexible hose 16 having a first end connected to the inlet of the vacuum. A second end of the flexible hose is equipped with a rigid sleeve mounted thereon. A plurality of threaded grooves are formed in an outer surface of the sleeve for reasons that will become apparent hereinafter. In the preferred embodiment, the hose has a length of no less than 3–4 feet and further has an inner surface that is coated with TEFLON.

Figure 4:
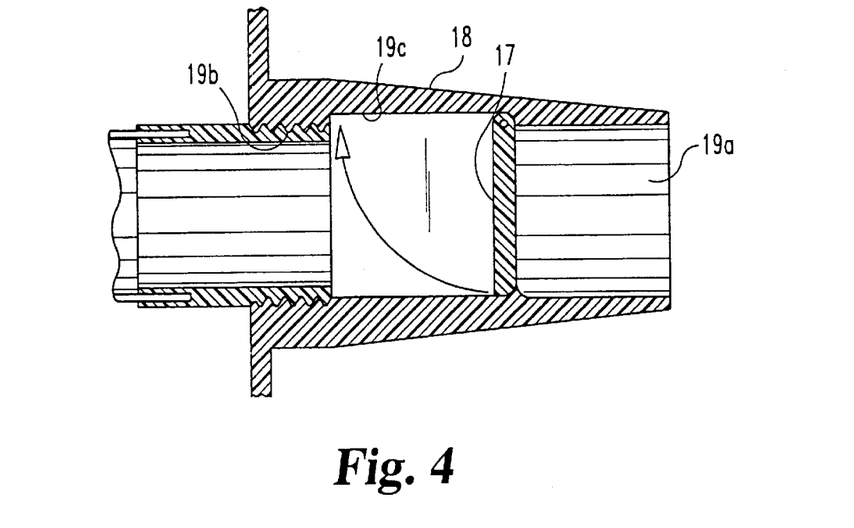
FIG. 4 is an illustrative cross-sectional view taken along line 4—4 of FIG. 3 of the valve.

With reference to FIG. 4, there is illustrated a valve 18 including an outer frusto-conical configuration and an axial bore 19a formed therein. Such bore 19a has an inboard extent with a plurality of threads 19b formed therein for releasably coupling with the sleeve of the hose 16. An intermediate extent 19c of the bore 19a is preferably equipped with a square cross-section and a predetermined width. Associated therewith is a cylindrical outboard extent with a predetermined diameter less than the predetermined width of the intermediate extent. The valve 18 further includes a flap 17, preferably square, hingably coupled within the intermediate extent adjacent the outboard extent. In use, the flap 17 is adapted to pivot only inwardly toward the inboard extent between a closed and open orientation. Preferably, the flap is spring biased and is urged closed.

Figure 2:
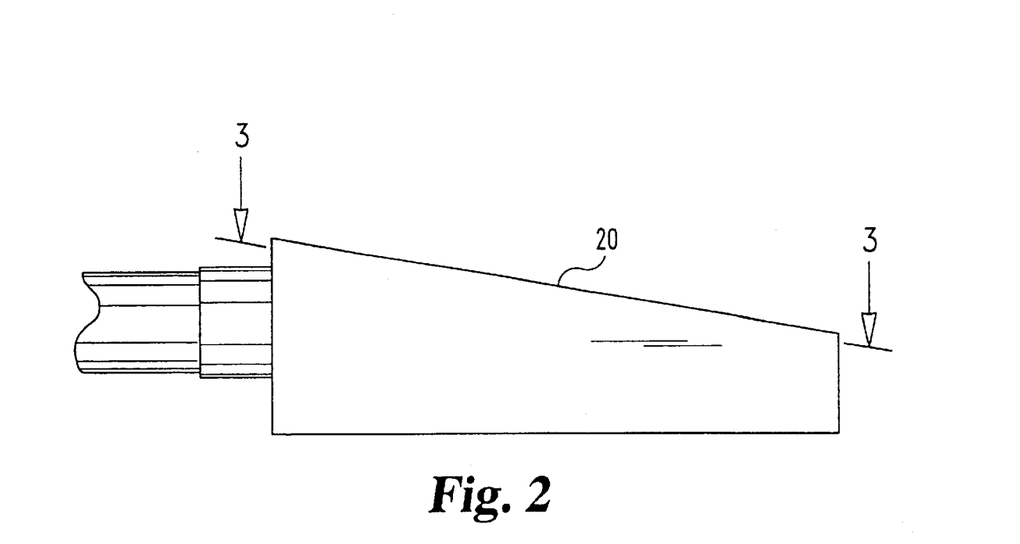
FIG. 2 is a side elevational view of the embodiment of a bait compartment comprising a portion of the FIG. 1 pest control apparatus.
Figure 3:
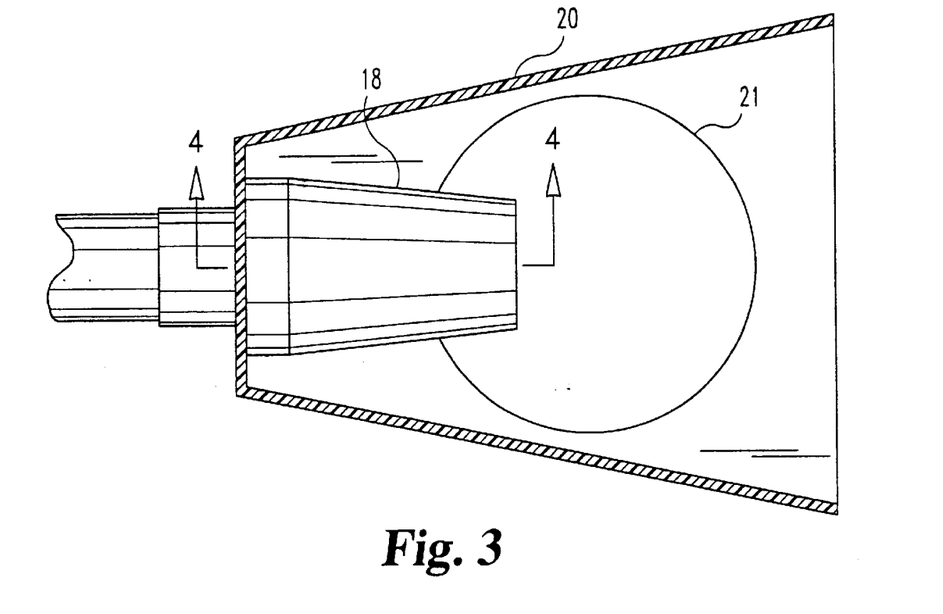
FIG. 3 is an illustrative cross-sectional view of the bait compartment taken along line 3—3 shown in FIG. 2.

As shown in FIGS. 2 & 3, a bait compartment 20 is provided preferably including a planar top face and a planar bottom face each with a trapezoidal configuration. The bait compartment further includes a pair of tapering side faces mounted between the top face and bottom face. As such, a small inboard opening is defined which is coupled about an inboard end of the outer periphery of the valve 18. Further, a large outboard opening is defined for providing an entrance. The bottom face of the compartment 20 has an upper surface with a circular recess 21 formed therein for containing bait to attract insects as illustrated in FIG. 3. In one embodiment, the bait consists of an odor producing material. For example, the odor attractor could be a food of various kinds which would be tailored to the type of insect or other pest for which the pest control apparatus was intended for use upon. For example, flies and roaches will generally be attracted to rotting food and Japanese beetles are generally attracted to corn and other plants. It should be understood that those of ordinary skill in the art will be able to select from amongst various foods that produce the most desirable odor for catching various pests. Additionally, it should be further understood that the bait placed in circular recess 21, need not be limited to that which is capable of being placed in circular recess 21, but may instead be located elsewhere in the bait compartment 20. It should be further understood that other odor producing materials are contemplated as within the scope of the invention including, but not limited to, the use of other substances attractive to insects, such as vanilla extract, or gender attractants, which will prove especially useful in environments where there are a variety of natural attractants in the immediate vicinity of bait compartment 20 which would compete for the insects' interest.

Finally, situated within and connected to the vacuum is an actuator means (not shown) for actuating the same intermittently for periods of 2–3 minutes following intervals of a predetermined duration. Such intervals may be 1, 2, 5, or 10 minutes in duration. This allows for the suctioning of the insects from the bait compartment 20. In the preferred embodiment, the intervals are selected by the user by way of a dial or the like. The actuator means further includes a manual cut off switch for unconditionally precluding operation of the vacuum. The actuator means could comprise, but is not limited to a timer.

Figure 5:
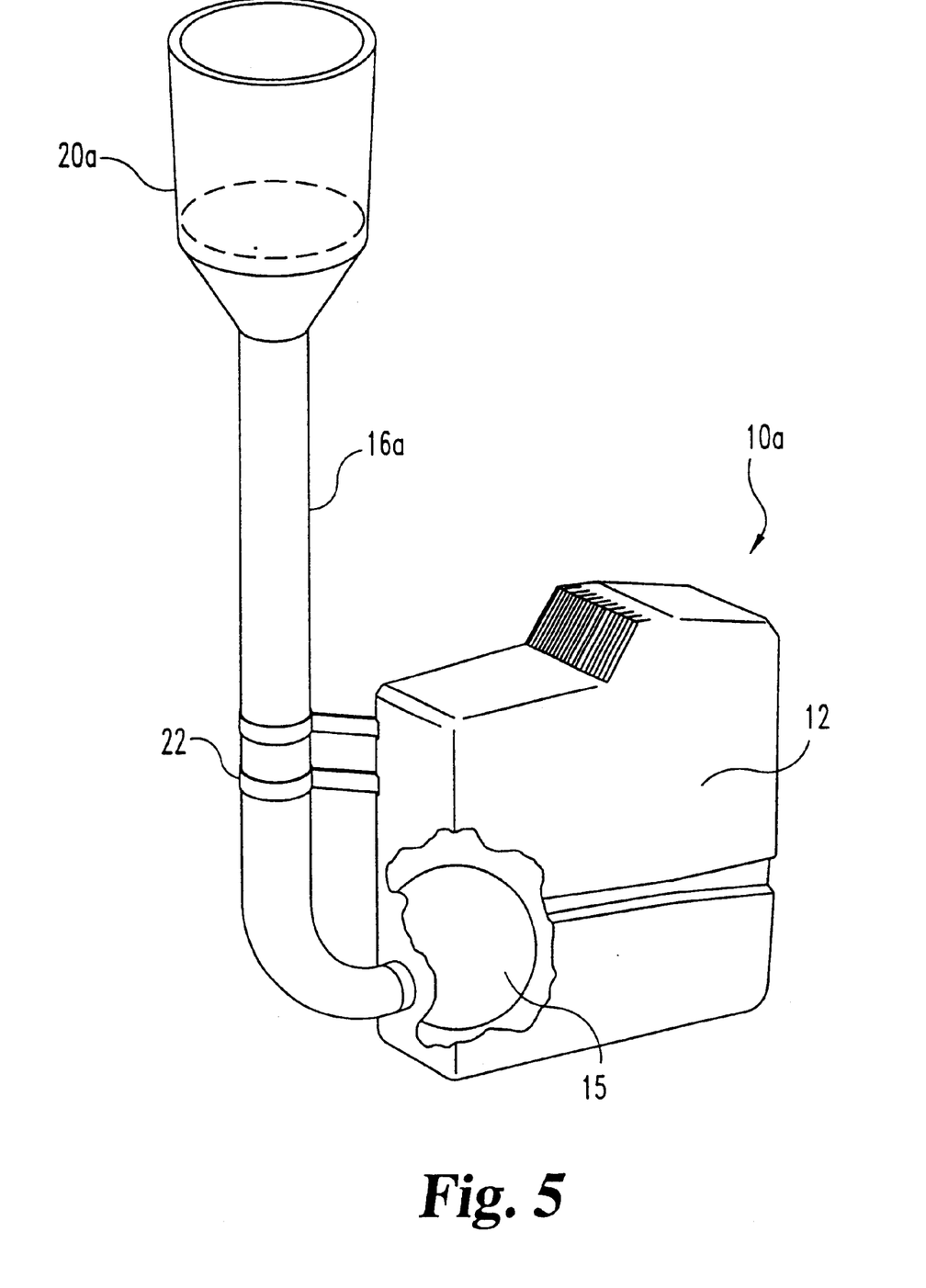
FIG. 5 is an alternate embodiment of the present invention in which the bait compartment has a vertical orientation.
Figure 6:
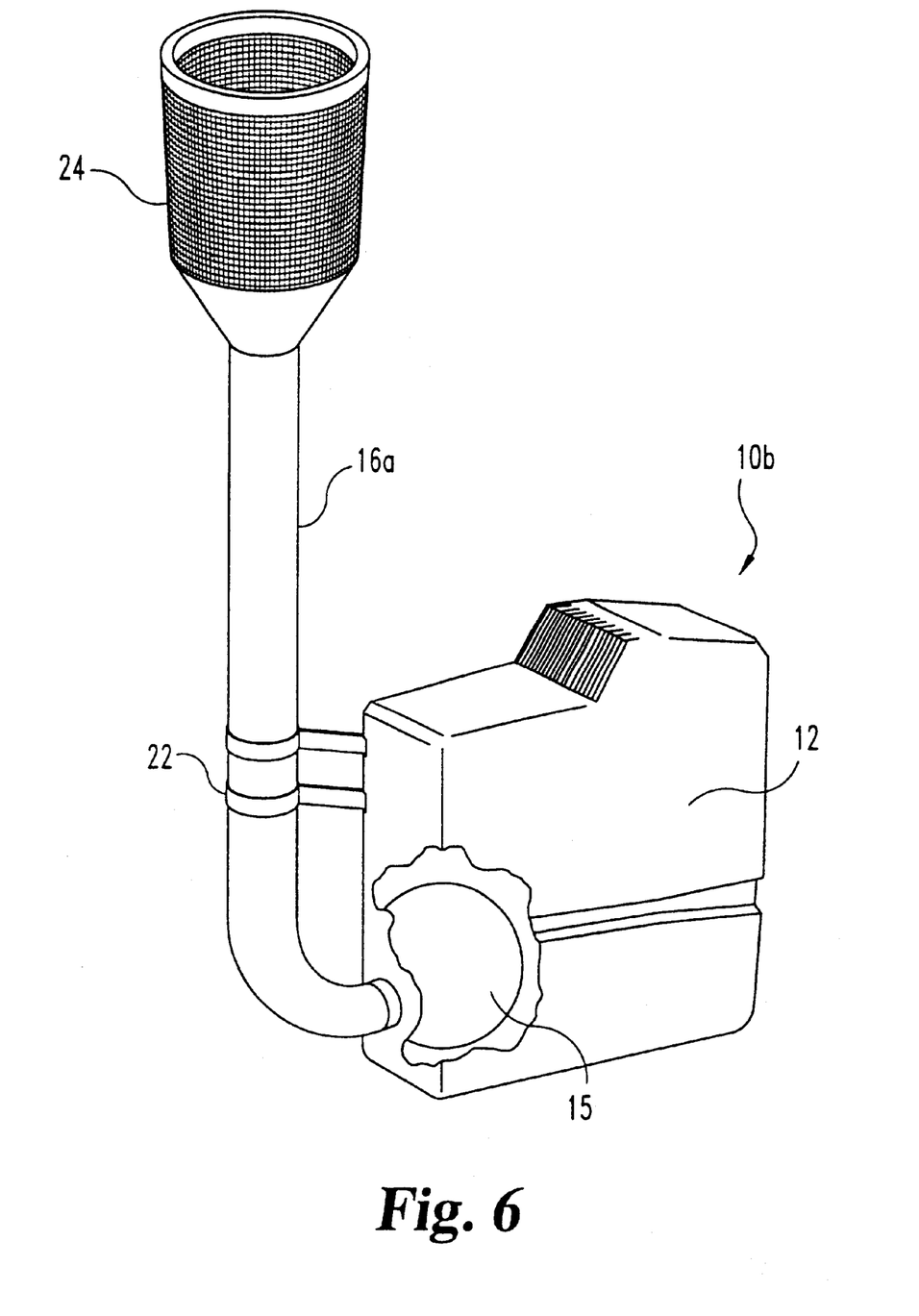
FIG. 6 is an alternative embodiment of FIG. 5 having a bait compartment with a wire mesh surface.

In an alternate embodiment, as shown in FIG. 5, pest control apparatus 10a has a brace 22 mounted on the vacuum 12 for releasably securing the hose 16a in a vertical orientation. It should be noted that in the embodiment of FIG. 5, the hose 16a has a greater resiliency than the hose 16 of the previously described embodiment. Hose 16a must have a greater resiliency in order to maintain its vertical orientation. Additionally, it should be further noted that in the embodiment of FIG. 5, the bait compartment 20 of the prior embodiment has been replaced with a bait compartment 20a having a generally conical configuration in contrast to the geometrical shape given to the bait compartment 20 of the previous embodiment. With reference to FIG. 6, in yet another embodiment, the bait compartment 20 of the previous embodiment is replaceable with a meshed screen 24 for flies and the like to rest on. Again, as in the previous embodiments, a variety of pest attractors may be used as bait in the embodiments disclosed in FIGS. 1–6. These may include food, and various chemical buttons, (including, as previously mentioned, gender attractants) and, as further discussed below, may also include attractors in the form of light which may be both visible and/or ultraviolet and various sonic attractors.

Figure 7:
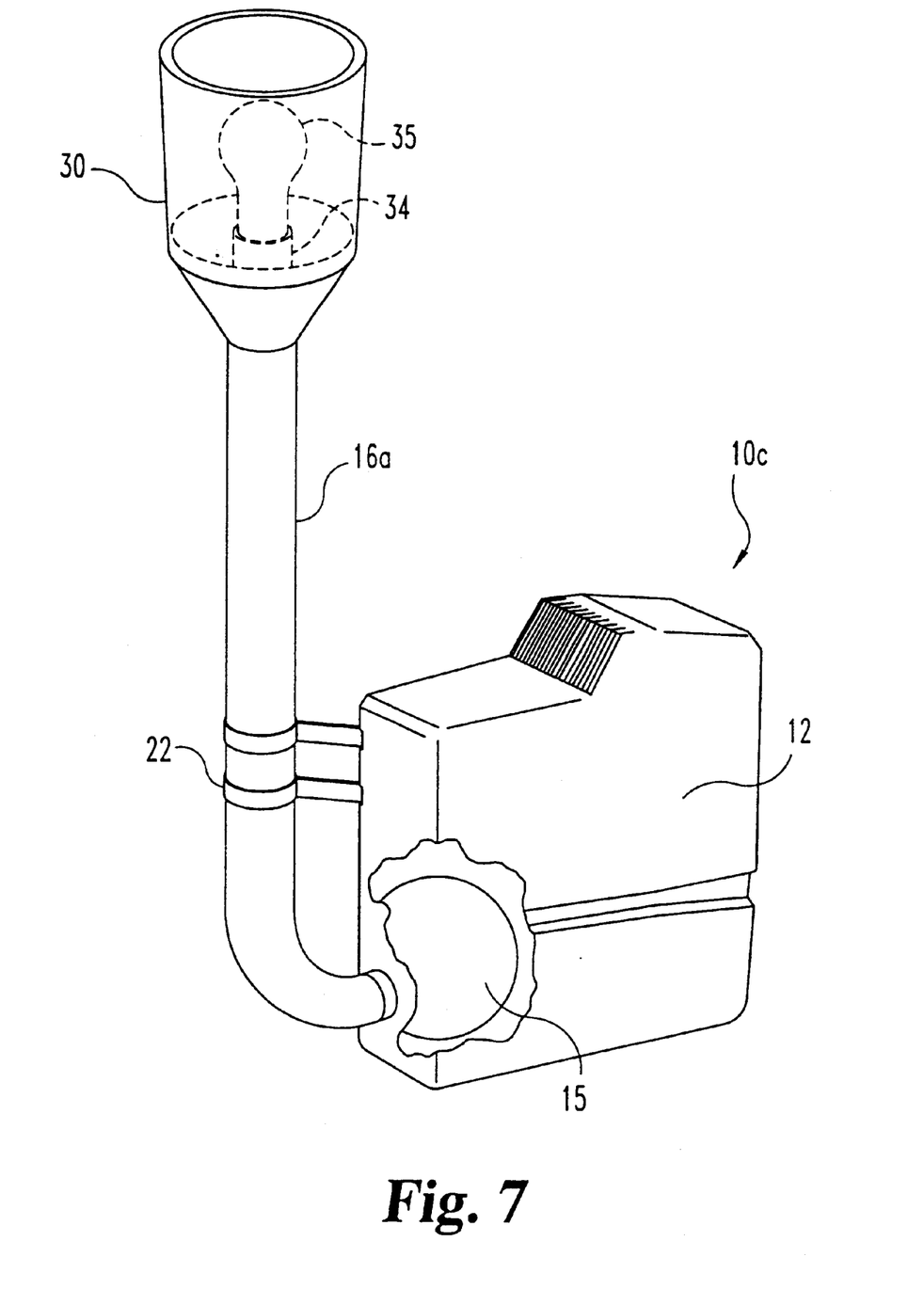
FIG. 7 is an alternative embodiment of the pest control apparatus of FIG. 5 in which the bait compartment includes a light bulb for luring pests to a position where they may be suctioned.

For example, with reference to FIG. 7, there is shown yet another embodiment of pest control apparatus 10c with like elements labeled as previously. In this embodiment, the bait compartment 30 comprises a light socket 34 receiving a light bulb 35 therein. The light bulb 35 is used as another form of attractor means for various pests. The light bulb 35 may be selected to emit light in either the visible, ultraviolet or other wavelength ranges as desired.

Figure 7A:
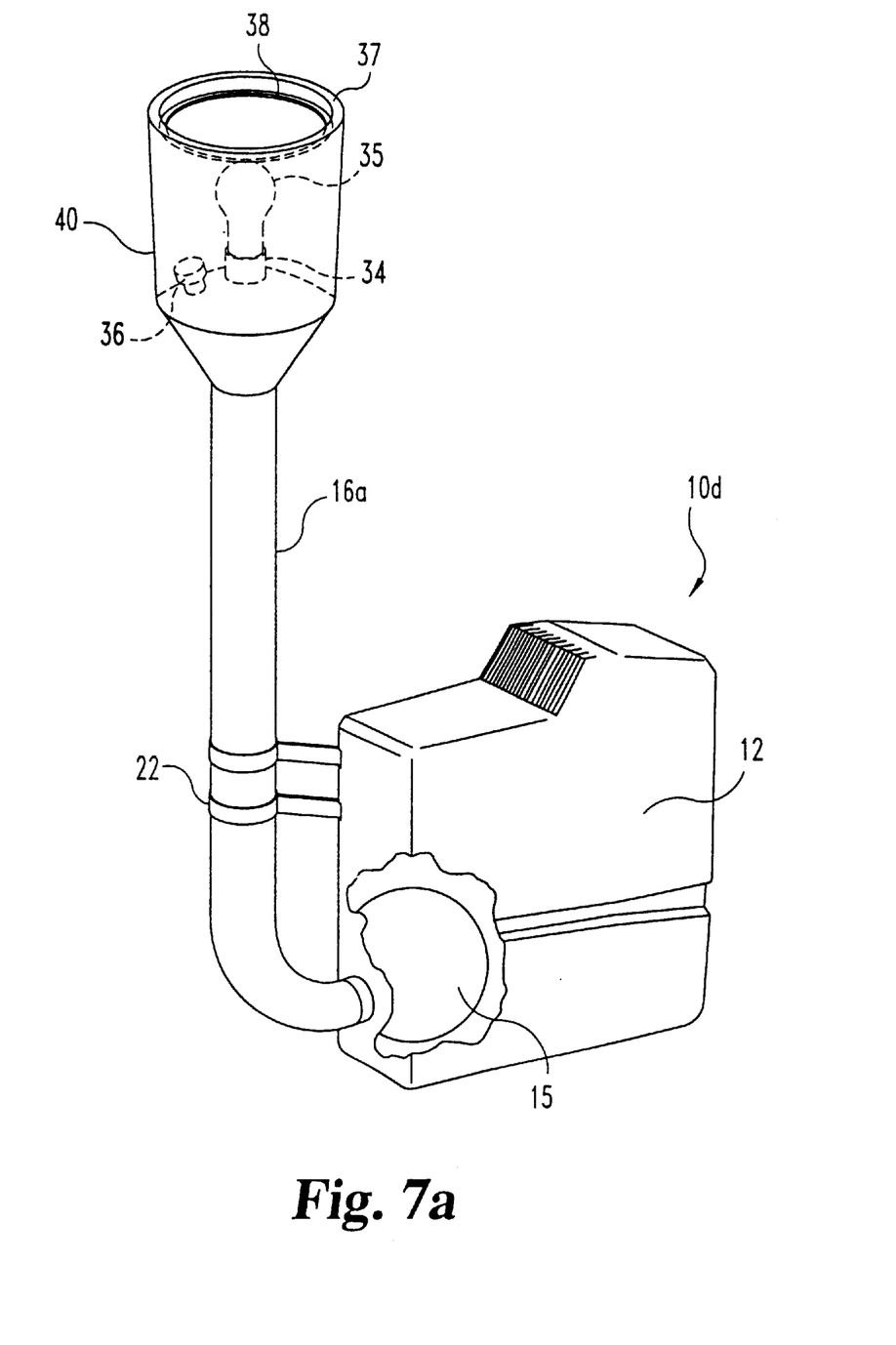
FIG. 7a is an alternative embodiment of the invention in FIG. 7 further including a chemical button for luring pests into a position where they may be suctioned.

With reference to FIG. 7a, there is illustrated yet another embodiment of pest control apparatus 10d. Pest control apparatus 10d includes a bait compartment 40 having a light socket 34 receiving a light bulb 35 therein. Bait compartment 40 further includes at least one chemical button 36 which is received in an aperture (not shown) in which it may be inserted and removed as desired. The pest control apparatus 10d also preferably includes a sensor 38 around the lip 37 of bait compartment 40. Sensor 38 detects the presence of pests entering the bait compartment and may be connected to the actuating means which trigger the beginning of suction by the vacuum 12. The sensor 38 may detect motion, thermal patterns associated with pests, or even sound. The sensor 38 may be an infrared emitter/detector for sensing motion or other means known to those of ordinary skill in the art.

It should be understood that while bait compartment 40 is illustrated as having only one aperture and corresponding chemical button 36, it is contemplated as within the scope of the invention that a plurality of chemical buttons and/or a plurality of light sources may be used in combination with one another. It should be further understood that while the use of a a chemical button 36 which engages or interlocks a receiving aperture in bait compartment 40 is preferable, it is not necessary. Other attachment mechanisms are contemplated as within the scope of the invention. For example, the surface of the bait compartment 40 could be metallic and the chemical button 36 could have a magnet on one end. Or the chemical button could be glued or taped to the surface of the bait compartment 40. Thus, the pest control apparatus 10d permits the use of a wide variety of attractants including both light and odors which may be replaced as desired permitting the user to more carefully tailor the use of attractants for particular pests. It should be further understood that the use of a plurality of chemical buttons 36 permits the user to select chemical combinations or odoriferous combinations for maximum effectiveness.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Figure 8:
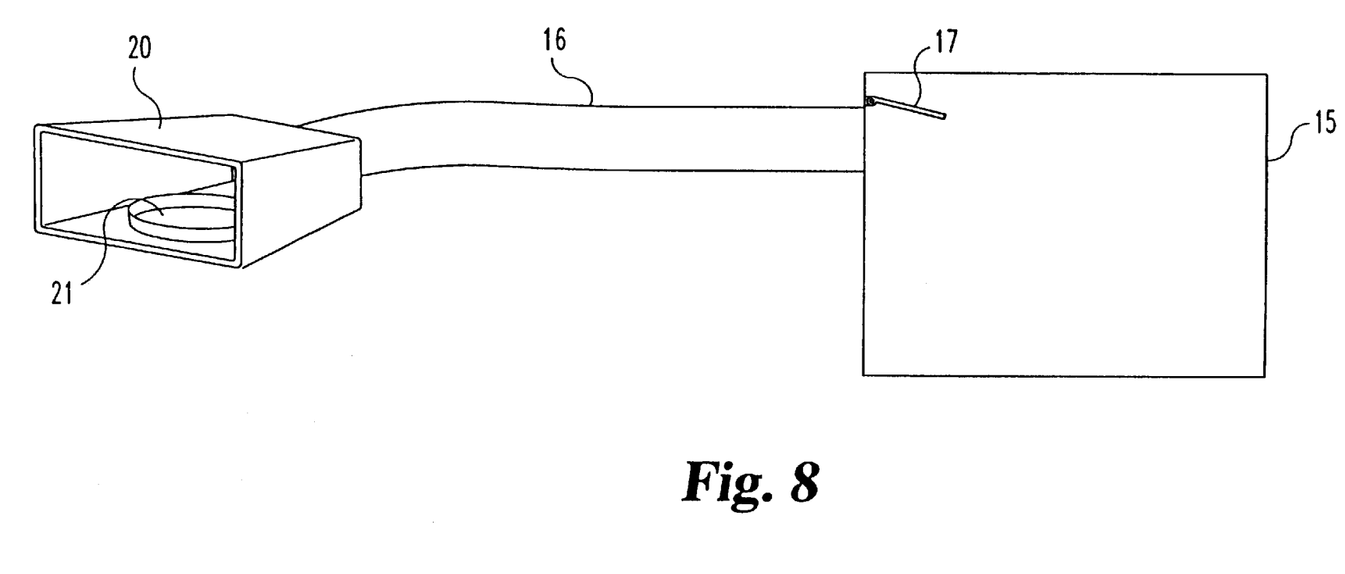
FIG. 8 is an illustrative view of a portion of an alternative embodiment of the present invention comprising a one way valve within a bag.

For example, it is contemplated as within the scope of the invention that the differing forms and various features of the bait compartments 20, 20a, 30 and 40 may be interchanged as desired. It is further understood that the use of the wire mesh screen 24 is possible within any of the embodiments disclosed as are various combinations of such things as the light bulb 35 and socket 34 along with chemical buttons 36. That is to say a plurality of chemical buttons 36 may be used in isolation without any light bulbs whatsoever and vice versa. It should be further understood that the bait compartments 20a, 24, 30, and 40 may also include a circular recess as in the bait compartment 20 of FIG. 3 in which is received rotting food or sweeteners or other conventional bait for use as an attractor means. It should also be understood that the use of a one way valve 18 and square flap 17 at either the inlet of the hose or at the inlet of the vacuum bag 15 (see FIG. 8), or both, is contemplated as within the scope of the invention.

While the invention has been illustrated and described in detail in the drawings and foregoing description, the same is to be considered illustrative and not restrictive in character, it being understood that only the preferred embodiments have been shown and described and that all changes and modifications that come within the spirit of the invention are desired to be protected.

What is claimed is:

1. An apparatus, comprising:
    a vacuum having an inlet and operational to suction air and a pest;
    a mechanical housing having a first opening at one end open to the atmosphere and adapted for allowing passage of a pest into said housing and a second opening at the other end adapted for allowing the passage of the pest from said housing;
    a hose coupled between said inlet of the vacuum and said second opening, said hose spacing said mechanical housing from said vacuum and providing a fluid flow passageway therebetween;
    a bait located within said housing and adapted for attracting the pest into said housing, said bait including at least one light source and at least one chemical button;
    a vacuum control actuator located within said mechanical housing and being actuated upon the presence of the pest, wherein said vacuum control actuator operational to control the vacuum; and
    valve control means located within said vacuum for controlling the flow through said inlet of the vacuum.

2. The apparatus of claim 1, wherein the at least one chemical button is an odor producing material.

3. The apparatus of claim 2 wherein said hose is substantially flexible; and
    which further includes a bait holder for receiving said bait therein.

4. The apparatus of claim 3
    wherein said valve control means is a one way flap valve disposed in fluid communication with said flexible hose.

5. The apparatus of claim 4 wherein said actuator includes a sensor for detecting the presence of a pest within said housing.

6. The apparatus of claim 4 wherein said actuator includes a timer for actuating the vacuum intermittently following intervals of a predetermined duration for suctioning the pests.

7. The apparatus of claim 3, wherein said valve control means has an aperture formed therethrough, said aperture has an inboard extent, an intermediate extent and an outboard extent, said inboard extent releasably coupling with said hose, said intermediate extent has a width, and said outboard extent has a diameter less than said width, said valve control means including a pivotal member coupled within the intermediate extent and adapted to pivot only inwardly toward the inboard extent between a closed and open orientation.

8. The apparatus of claim 1 wherein the at least one light source emits light in the ultraviolet wavelength range.

9. The apparatus of claim 8 wherein the at least one chemical button emits a sex attractant.

10. A pest control apparatus comprising:
    a bait compartment having an inlet at one end open to the atmosphere and an outlet at the other end, said bait compartment including an interior volume;
    a vacuum disposed in fluid communication with said bait compartment and adapted to suction air and pests from said interior volume through said outlet upon the actuation thereof, wherein said bait compartment is located remote from said vacuum;
    light attractor means located within said interior volume of the bait compartment for luring pests to a position within said interior volume where the pests may be suctioned through said outlet by said vacuum;
    chemical attractor means located within said interior volume of the bait compartment for luring pests to a position within said interior volume where the pests may be suctioned through said outlet by said vacuum, said chemical attractor means located proximate said light attractor means;
    actuator means for actuating the vacuum;
    a sensor located within said interior volume proximate said inlet for detecting the pests and operatively connected to said actuator means; and
    a one way valve located within said vacuum and operable to control the flow of air and pests from said outlet and into said vacuum during actuation of said vacuum.

11. An apparatus as set forth in claim 10 wherein the actuator means is adapted for actuating the vacuum intermittently following intervals of a predetermined duration for suctioning the insects.

12. An apparatus as set forth in claim 11 wherein said bait compartment is located remote from said vacuum by a flexible hose connected from said outlet to said vacuum;
    wherein the sensor is an infrared emitter/detector; and
    further wherein said bait compartment has a cylindrical shape with an outer wall member and said chemical attractor means is positioned closer to said outer wall member than said light attractor means.

13. An apparatus as set forth in claim 10 wherein said bait compartment is located remote from said vacuum by a flexible hose connected from said outlet to said vacuum.

14. An apparatus as set forth in claim 13 wherein the sensor is an infrared emitter/detector.

15. An apparatus as set forth in claim 10 wherein said bait compartment has a cylindrical shape with an outer wall member, and said chemical attractor means is positioned closer to said outer wall member than said light attractor means.

16. The apparatus of claim 10, wherein said one way valve has an aperture formed therethrough, said aperture has an inboard extent, an intermediate extent and an outboard extent, said intermediate extent has a width, and said outboard extent has a diameter less than said width, said valve including a single pivotal member coupled within the intermediate extent and adapted to pivot only inwardly toward the inboard extent between a closed and open orientation.

\* \* \* \* \*